(No Model.) 2 Sheets—Sheet 1.
J. F. McLAUGHLIN.
SECONDARY BATTERY.

No. 408,666. Patented Aug. 6, 1889.

WITNESSES:
Percy C. Bowen,
F. T. Chapman

INVENTOR,
James F. McLaughlin
By Joseph Lyons
Attorney (No Model.) 2 Sheets—Sheet 2.

J. F. McLAUGHLIN.
SECONDARY BATTERY.

No. 408,666. Patented Aug. 6, 1889.

WITNESSES:

INVENTOR,
James F. McLaughlin
By Joseph Lyons
Attorney

UNITED STATES PATENT OFFICE.

JAMES F. McLAUGHLIN, OF PHILADELPHIA, PENNSYLVANIA.

SECONDARY BATTERY.

SPECIFICATION forming part of Letters Patent No. 408,666, dated August 6, 1889.

Application filed April 29, 1889. Serial No. 308,993. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Secondary Batteries, of which the following is a specification.

My invention has reference to improvements in secondary or storage batteries, and it refers more particularly to the construction of the electrodes of such batteries.

The object of the invention is to produce an electrode having a large surface exposed to the action of the current and a great quantity of active material held by the electrode in such manner that a great portion of its surface shall be in immediate contact with the electrolytic fluid, and that said active material shall be so safely and securely housed as to prevent the peeling off, which is a great source of annoyance in storage-batteries heretofore made or proposed. This peeling off of the active material is one of the reasons, if not the main reason, why secondary batteries cannot be used with advantage for the propulsion of vehicles; and by my invention this inconvenience is effectively avoided. The peeling off of the active material due to the porosity and incoherency of the same, after a charge has been imparted to the battery, is promoted in ordinary secondary batteries by the liability of the electrodes to bend and buckle, and this liability is reduced by my invention to a minimum, if not entirely avoided. All this will more fully appear from the following detailed description, in which reference is made to the accompanying drawings, which form a part hereof, and in which I have shown, in—

Figure 1:
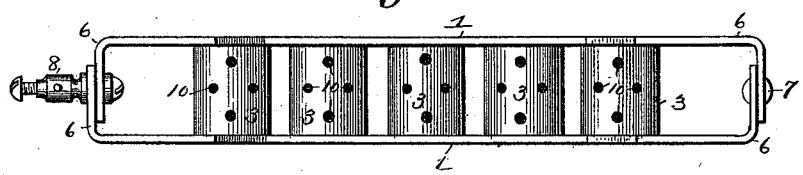
Figure 2:
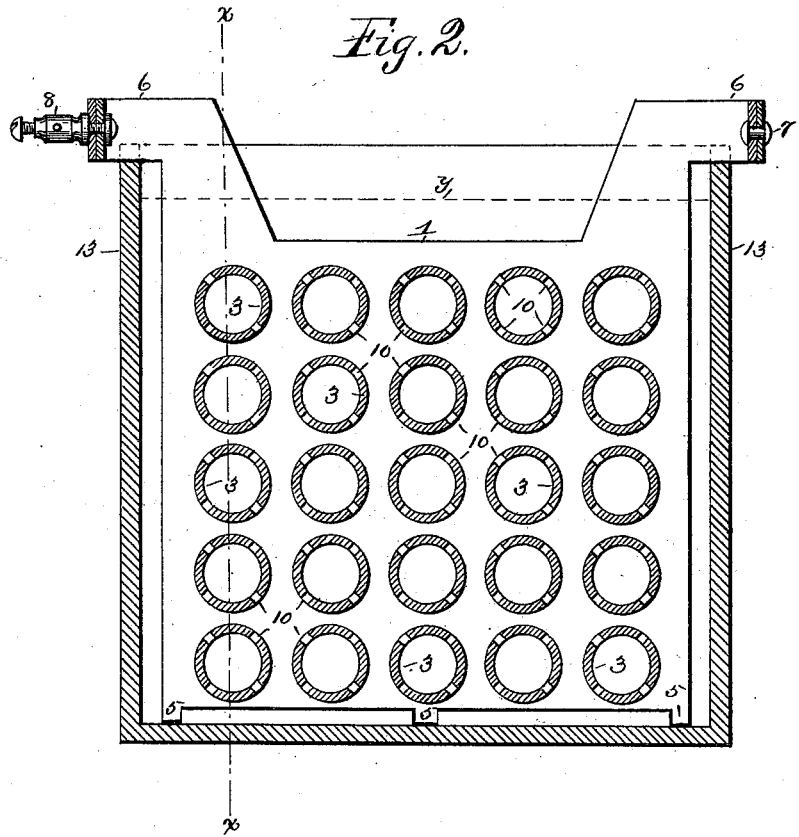
Figure 3:
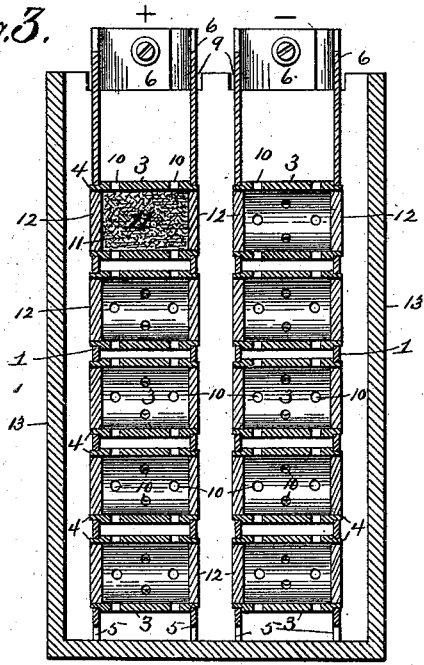
Figure 4:
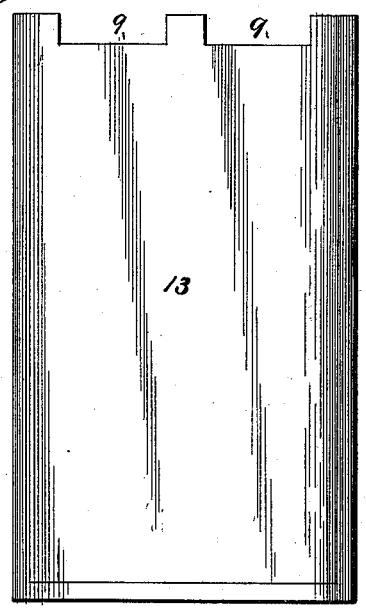

Figure 1, a plan view of one of my improved electrodes; Fig. 2, a longitudinal vertical section through the jar and through one of the electrodes of my improved secondary battery. Fig. 3 shows a transverse section of my improved secondary battery, the section being taken on line *x x* of Fig. 2. Fig. 4 is an end elevation of the jar, and Fig. 5 a vertical transverse section of a modification of my invention.

Like numerals of reference indicate like parts throughout the drawings.

Each electrode is composed of two plates 1 1, of lead or other suitable metal, placed parallel to each other and bridged and held apart by a number of tubes 3 3, &c., made of the same metal and inserted into holes in the two plates, which holes register with each other and are of such size that the tubes will be held therein frictionally. By preference, however, the tubes are reduced in size so as to form a neck at each end, as shown at 4 4, &c., in Figs. 3 and 5, whereby a shoulder is formed near each end of the tube. The distance of the two shoulders from each other gages the distance from each other of the two plates 1 1. A very small portion of each neck 4 projects beyond the plate 1, and this free end of the neck may be turned outwardly by means of a proper tool, whereby the tube is in a manner riveted to the plates. The outward turn of the free end of the neck, however, is so small that it is impracticable to show it in the drawings, nor is this of sufficient importance to be shown.

The plates 1 1 are in the main rectangular in form, provided with feet 5 5 5, and a portion in the middle of the upper end is preferably cut away. In Fig. 2 the cut-away portion is shown trapezoidal in form; but this is not essential. At the upper end each plate is extended into horizontal bands 6 6, which bands are turned at right angles to each other so as to overlap, as shown in Figs. 1 and 2, and at one end the overlapped portions are riveted together by a lead rivet 7 and at the other end they are secured together to a binding-post 8. An electrode-plate thus formed is a rigid structure, which will not bend or buckle either by the charging process or by the jarring and jolting of the battery, to which it is subjected in transport. I may use two, three, or more electrodes in each jar, and for the purpose of keeping the electrodes properly spaced the upper edges of the ends of the jars have formed therein a series of notches 9 9, into and over which the bands 6 6 extend.

Figure 5:
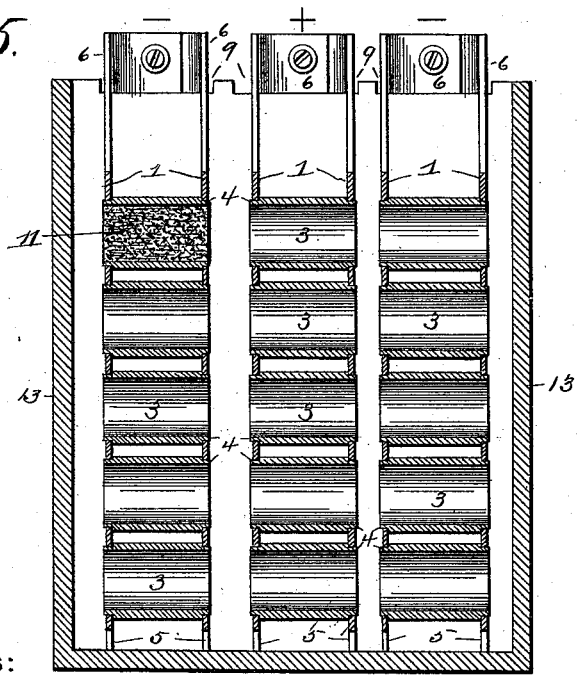

The tubes 3 3 are used as receptacles for the active material, and these tubes may be either solid throughout their whole length, as shown in Fig. 5, or may be perforated by a number of holes 10, distributed in any desired manner, as shown in Figs. 1, 2, and 3. The latter is the preferred construction, for reasons which will presently appear.

I may use any of the active materials well known in the art, but by preference I use oxide of lead in the composition known as "red oxide of lead," or I may use minium or peroxide of lead or any other well-known active material.

If red lead is used, I make a thick paste of the same by mixing it with diluted sulphuric acid, and in one form of my invention I form a cylinder of that paste, which after formation is baked, so that it may be handled as a solid block. Such baked cylinder of active material I insert into each tube, and it is ordinarily made of such diameter that it will be held therein frictionally. In Fig. 5 such a cylinder of active material is shown at 11 inserted in one of the lead tubes of an electrode, and there it fills the tube from one end to the other. By preference, however, the baked cylinder is made shorter than the tube, as shown in Fig. 3, in which case it need not be made to closely fit the bore of the tube, but may be inserted loosely, and it is then held within the tube by plugs 12, of a soft paste of the active material, inserted in each end of the lead tube after the baked cylinder has been inserted.

It will be seen that an electrode constructed in accordance with my invention may have a great quantity of active material securely embedded, and if the form of my invention shown in Figs. 1, 2, and 3 be used a very great surface of the active material will be exposed to electrolytic action, for the holes 10 10 10, &c., may be very numerous, so that the active material is reached by the battery fluid through these holes.

When a battery of this kind is charged, the baked plug 11 will expand and portions of it will protrude through the holes 10, so that a great surface of peroxide of lead will be formed on one electrode and a great surface of porous lead on the other electrode, since the battery-fluid can reach every portion of the lead plates.

As stated above, I may use two or more electrode-plates with my battery. In Fig. 3 two such plates are shown, and in Fig. 5 three electrode-plates are indicated, in which latter case one of the plates may be used as one pole and the two others, properly connected, as the other pole; but any other number of electrode-plates may be used, and they may be connected in any desired manner well understood by those skilled in the art.

The jar 13 may be made of glass, glazed earthenware, hard rubber, paraffined wood, or any other suitable insulating material.

In using my battery the jar is preferably filled with the battery-fluid to such height as to cover the whole not-reduced portion of the electrodes, as indicated by the dotted line $y$ in Fig. 2.

I am not confined to the use of a baked cylinder of active material, for in some cases I may use with advantage the active material in a pasty form, or I may simply fill the tubes, especially when they are not perforated, with the dry powder or with dry granules of active material, and with a pasty plug of the same at each end of the tube.

My improved electrode-plates may also be used for secondary batteries of the Planté type without a special filling of active material in the tubes, the rigidity of the structure of the plates and the great exposed surface of the same being features of special advantage in all kinds of secondary batteries.

Having now fully described my invention, I claim and desire to secure by Letters Patent—

1. In a secondary or storage battery, an electrode consisting, essentially, of plates of lead or other suitable material held a distance apart by a series of lead tubes extending between and through the plates, and spaced, as shown, to leave a clear passage between the tubes, substantially as described.

2. In a secondary or storage battery, an electrode composed of plates of lead or other suitable material held a distance apart by a series of perforated tubes extending between and through the plates, and spaced, as shown, to leave a clear passage between the tubes, substantially as described.

3. In a secondary or storage battery, an electrode composed of plates of lead or other suitable material held a distance apart by a series of tubes extending between and through the plates, said tubes being spaced, as shown, to leave a clear passage between them to expose their whole surface to the electrolyte, and filled with active material, substantially as described.

4. In a secondary or storage battery, an electrode composed of plates of lead or other material held a suitable distance apart, with lead tubes extending between and through the plates, and a core of baked active material within each tube, substantially as described.

5. In a secondary or storage battery, an electrode composed of plates of lead or other material held a suitable distance apart, with perforated lead tubes extending between and through the plates, a core of baked active material in each tube, and a plug of plastic active material in each end of the tubes, substantially as described.

6. In a secondary or storage battery, an electrode consisting of the combination of two lead plates arranged parallel to and at a suitable distance from each other, with perforated lead tubes extending between and through the plates, a core of baked red oxide of lead within each tube, and a plug of pasty red lead for each end of each tube, substantially as described.

In testimony whereof I have signed my name to this specification in the presence of two subscribing witnesses.

JAMES F. McLAUGHLIN.

Witnesses:
JOSEPH LYONS,
JOSEPH FORREST.